Figure 1:
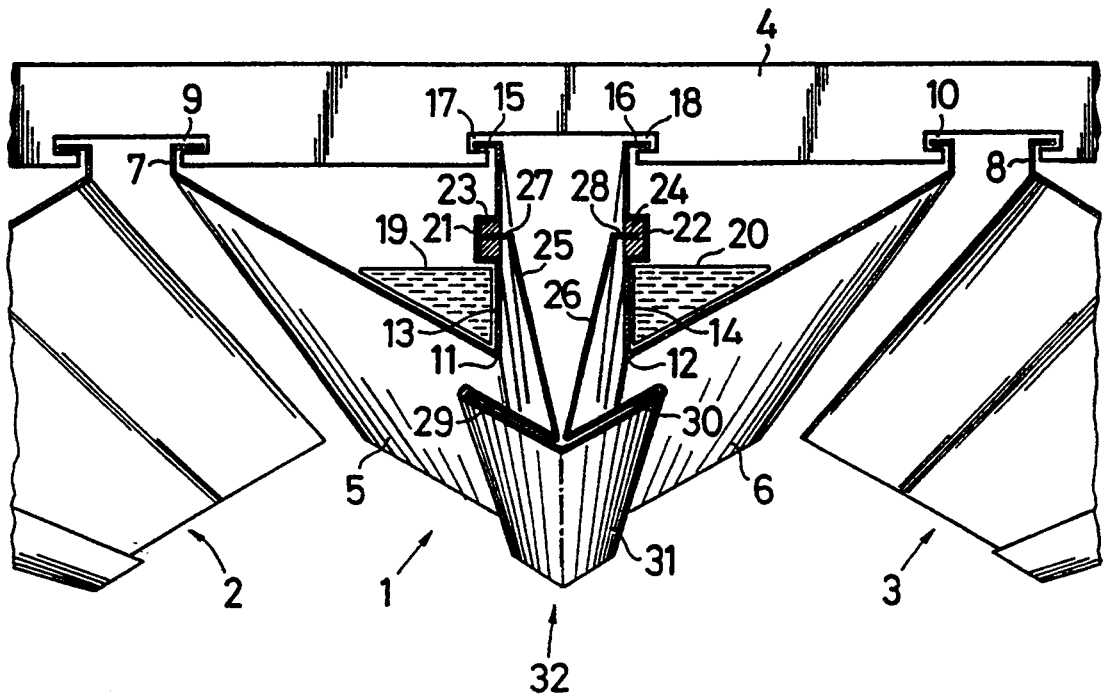

United States Patent
Köster

Patent Number: 5,363,908
Date of Patent: Nov. 15, 1994

[54] HEATING AND COOLING ARRANGEMENT IN PARTICULAR OF A STRUCTURE SUSPENDED FROM A ROOM CEILING

[76] Inventor: Helmut Köster, Karl-Bieber-Höhe 15, D-6000 Frankfurt (Main) 56, Germany

[21] Appl. No.: 924,055
[22] PCT Filed: Feb. 22, 1991
[86] PCT No.: PCT/EP91/00334
§ 371 Date: Aug. 24, 1992
§ 102(e) Date: Aug. 24, 1992
[87] PCT Pub. No.: WO91/13294
PCT Pub. Date: Sep. 5, 1991

[30] Foreign Application Priority Data
Feb. 24, 1990 [DE] Germany .................. 4005914
Oct. 2, 1990 [DE] Germany .................. 4031062
Oct. 10, 1990 [DE] Germany .................. 4032113

[51] Int. Cl.⁵ .......... F24F 5/00; F24F 13/22; E04B 9/02; F24D 3/16
[52] U.S. Cl. .......... 165/49; 165/56; 165/904
[58] Field of Search .......... 165/49, 53, 56, 904; 62/DIG. 1

[56] References Cited

U.S. PATENT DOCUMENTS

| | | | |
|---|---|---|---|
| 1,771,269 | 7/1930 | Musgrave et al. | 165/49 X |
| 2,655,348 | 10/1953 | Siering | 165/56 |
| 2,887,564 | 5/1959 | Baran | 165/49 X |
| 2,924,436 | 2/1960 | Baran | 165/56 |
| 3,080,914 | 3/1963 | Shippee et al. | 165/49 X |
| 3,143,637 | 8/1964 | Rifenbergh | 165/49 X |
| 3,384,158 | 5/1968 | Rothenbach | 165/49 |
| 3,786,230 | 1/1974 | Brandenburg, Jr. | 165/49 X |
| 3,905,203 | 9/1975 | Jacob | 165/49 X |
| 4,635,710 | 1/1987 | Shelly | 165/49 |
| 4,766,951 | 8/1988 | Bergh | 165/49 X |

FOREIGN PATENT DOCUMENTS

| | | | |
|---|---|---|---|
| 2035936 | 2/1972 | Germany | 165/49 |
| 897749 | 5/1962 | United Kingdom | 165/49 |
| 1014098 | 12/1965 | United Kingdom | 165/49 |
| 1137202 | 12/1968 | United Kingdom | 165/49 |

Primary Examiner—John Rivell
Attorney, Agent, or Firm—Koda and Androlia

[57] ABSTRACT

The invention relates to a heating and cooling arrangement with which the occurrence of sweat water at particular sites can be prevented. To this end a carrier is provided in which is disposed a pipe or tube system which transports a heating or cooling fluid. The temperature of the cooling fluid is given off to the carrier and radiated into the room. Below the carrier is located a sweat water channel connected mechanically with this carrier. In order to achieve a thermal separation between carrier and channel a heat resistance with a given heat insulation value is provided between the two or the channel is layed out so that it has on its underside a thermal insulator.

43 Claims, 7 Drawing Sheets

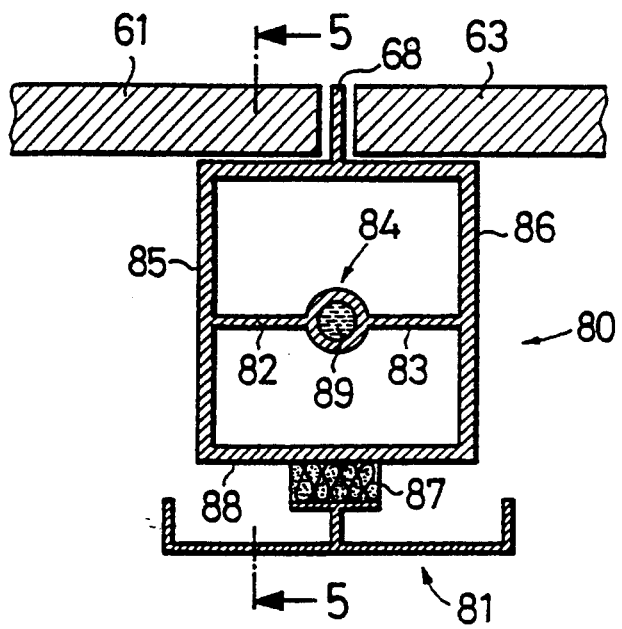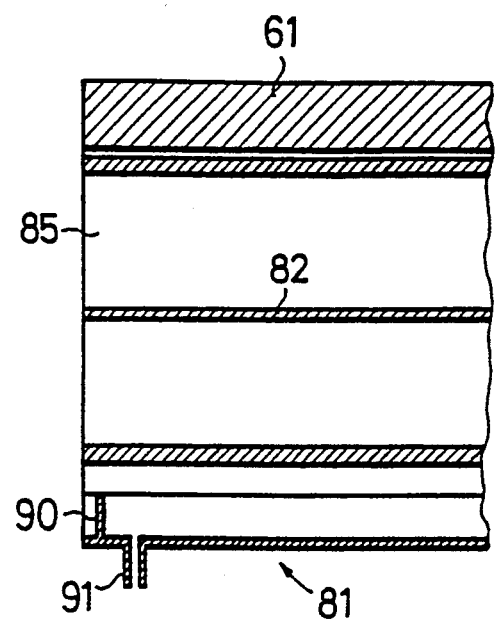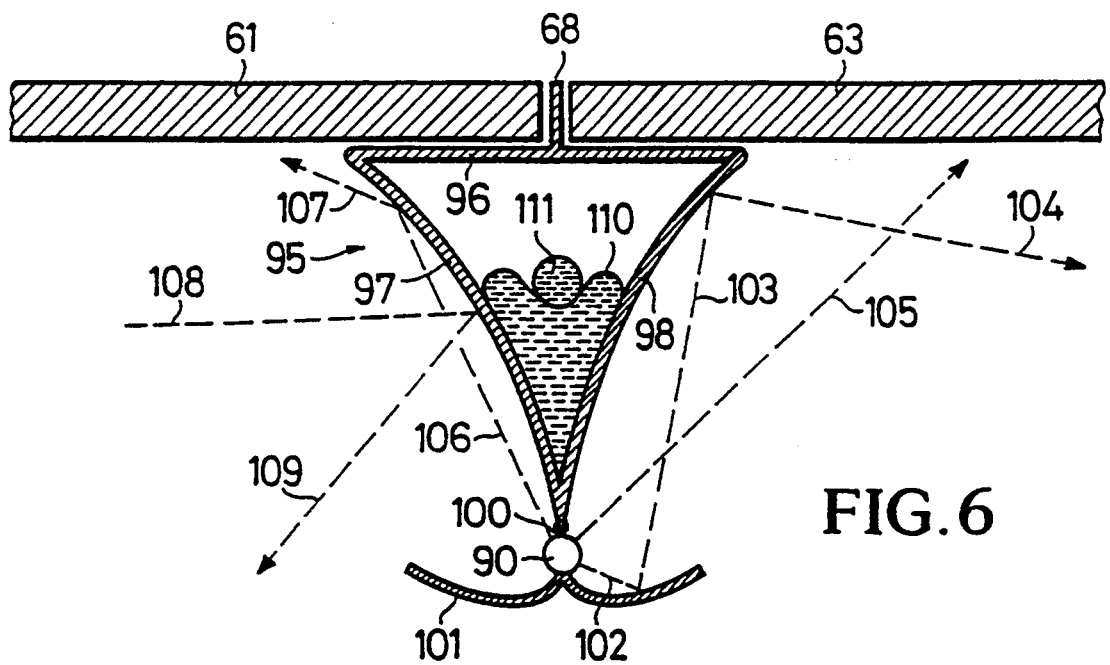

HEATING AND COOLING ARRANGEMENT IN PARTICULAR OF A STRUCTURE SUSPENDED FROM A ROOM CEILING

The invention relates to a cooling arrangement according to the preamble of Claim 1.

With heating and cooling arrangements in the vicinity of which bodies are located which with respect to temperature differ strongly from the temperature of the heating and cooling arrangement, the problem of condensation water development can occur if the heating and cooling arrangement as well as the bodies are surrounded by vapor-containing air. Such a condensation water formation is particularly disturbing if the cooling arrangement is of the type in which a cooling pipe through flows cooling fluid is disposed on a room ceiling. In this case is formed on these pipes condensation or sweat water which drips onto the floor.

Radiation heating systems are known having pipes through which flows a heating fluid which pipes are disposed on the underside of a bent metal sheet which, in turn, is fastened on a ceiling by means of wires (CH-P 282 290). Between two metal sheets disposed one next to the other a lamp is provided for purposes of illumination. If through the pipes flows a cooling fluid the formation of condensation water is unavoidable.

Furthermore a ceiling heating system is known with heating pipes disposed in parallel at a distance from one another wherein above the heating pipe is suspended a clamping rail having dovetail-form notches into which are slid the radiation bars (DE-AS 1 604 079). In the case of this ceiling heating system the formation of sweat water is also unavoidable if through the heating pipe flows a fluid whose temperature is significantly below the ambient temperature.

With another known heat exchanger having pipes welded on the underside of a metal plate and being suspended from a room ceiling (DE-GM 69 29 860) likewise no measures are taken to avoid or decrease the sweat water.

Furthermore, an arrangement for heating or cooling rooms utilizing solar rays or heat radiation by means of hollow bodies is known in which through the hollow bodies flows a gaseous or liquid heat carrier (AT-P 321 518). Into the hollow bodies storage substances are herein introduced whose crystallisation temperature for cooling the rooms is below the desired room temperature and above the radiation temperature of the hollow bodies exposed in the open. For the elimination of the developing condensate a condensate collector and a condensate pump are provided.

Further, a collector for a device for ventilating rooms with moist and/or greasy atmosphere is known which is fastened in the form of an element on a subceiling (DE-AS 2 718 611). This collector has several grooves of which some have openings upward and some openings downward. Each groove directed downward therein engages two grooves directed upward - and conversely. For heating or cooling a room these connected structures are not suitable.

In a known subceiling for shielding supporting ceilings which has surfaces at which condensate forms, ceiling elements are provided which project with their margin segments into a groove having an arc-form base element (DE-P 3 507 306). In order to be able to draw off fluids to the desired extent via an intermediate space between the groove and the ceiling elements the groove with respect to the ceiling elements is implemented to be height-adjustable. For heating and cooling devices with pipes carrying gaseous or liquid cooling media this subceiling is not suitable. The same applies also for a further known arrangement for ceiling suspension and area ventilation of rooms with grease-containing vapors (DE-OS 3 713 514).

Lastly, a ceiling/wall/radiation heat system is also known in which a heat-carrying water pipe is integrated into the radiation areas of a ceiling radiator (DE-OS 2 803 980). When using this system for cooling rooms it is possible to go below the dew point and the developing sweat water can be carried off in a groove-like lower cover strip. Specifically the system has a hollow aluminum profile section with rectangular cross section fastened on wood panelling of a concrete ceiling and carries a hot or cold water pipe between two walls. At the lower end of the two walls a sweat water channel is disposed which catches the sweat water dripping from the cooling pipe. The provided sweat water channel, however, is very small. Water running off on the outer side of the aluminum profile section runs over the sweat water edge because for this water only a projecting edge is provided which cannot receive the sweat water occurring on the outside.

This system has the disadvantage that the sweat water forming on the top of the cooling pipe cannot drip into the channel. The sweat water forming on the outer walls of the aluminum profile section is not at all or only extremely poorly carried off in the sweat channel. Added to this is the fact that the sweat water forming on the underside of the sweat water channel drips into the open space.

The invention is therefore based on the task of preventing the formation of sweat water on the underside of a sweat water channel.

This task is solved according to the features of Patent Claim 1.

The advantage achieved with the invention consists therein that on the underside of the sweat water channel it is prevented that a combination of moist outside air and the coldness of the cooling pipe occurs so that no sweat water can form which drips downward into open space.

With the invention not only the sensible heat but also the latent heat is carried from a room. Hereby it becomes superfluous to combine a cooling ceiling with a room ventilation system which has the task of humidifying or drying the air in a room. A simple window ventilation suffices. Humidity which potentially penetrates is condensed on cooling elements and carried off. The arrangement according to the invention can be installed as high-performance cooling ceiling since it can be operated with a greater temperature difference than conventional cooling ceilings which provide no sweat water elimination. While conventional cooling ceilings achieve a cooling capacity between 50 watts/m$^2$ and 100 watts/m$^2$, a cooling ceiling according to the invention permits cooling capacities up to 150 watts/m$^2$.

Figure 2:
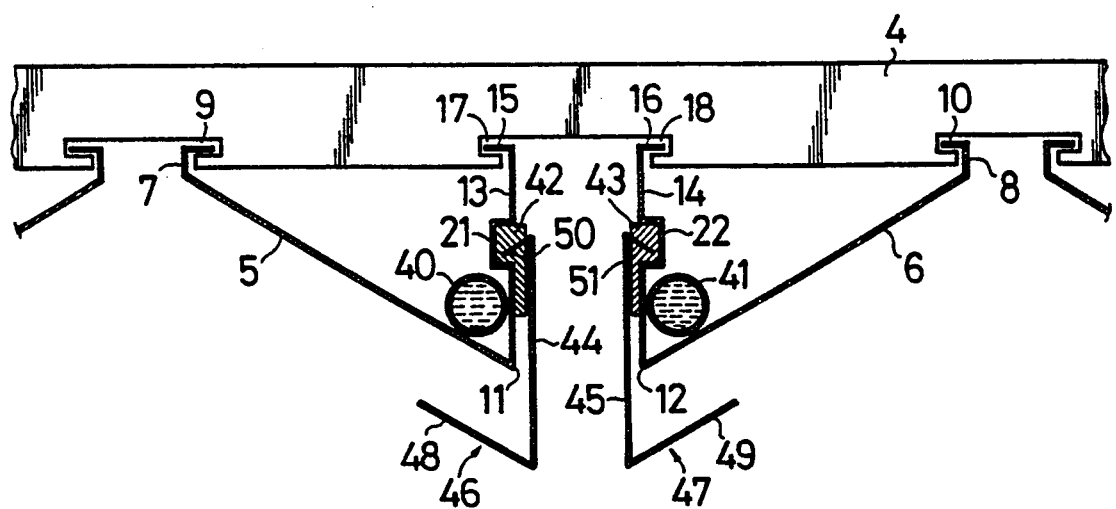
Figure 3:
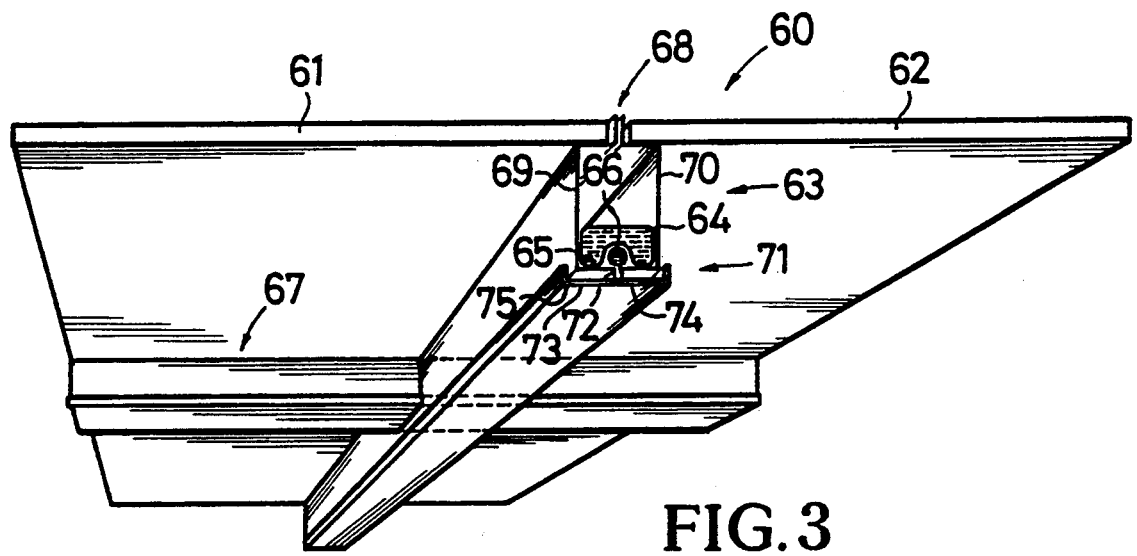
Figure 9:
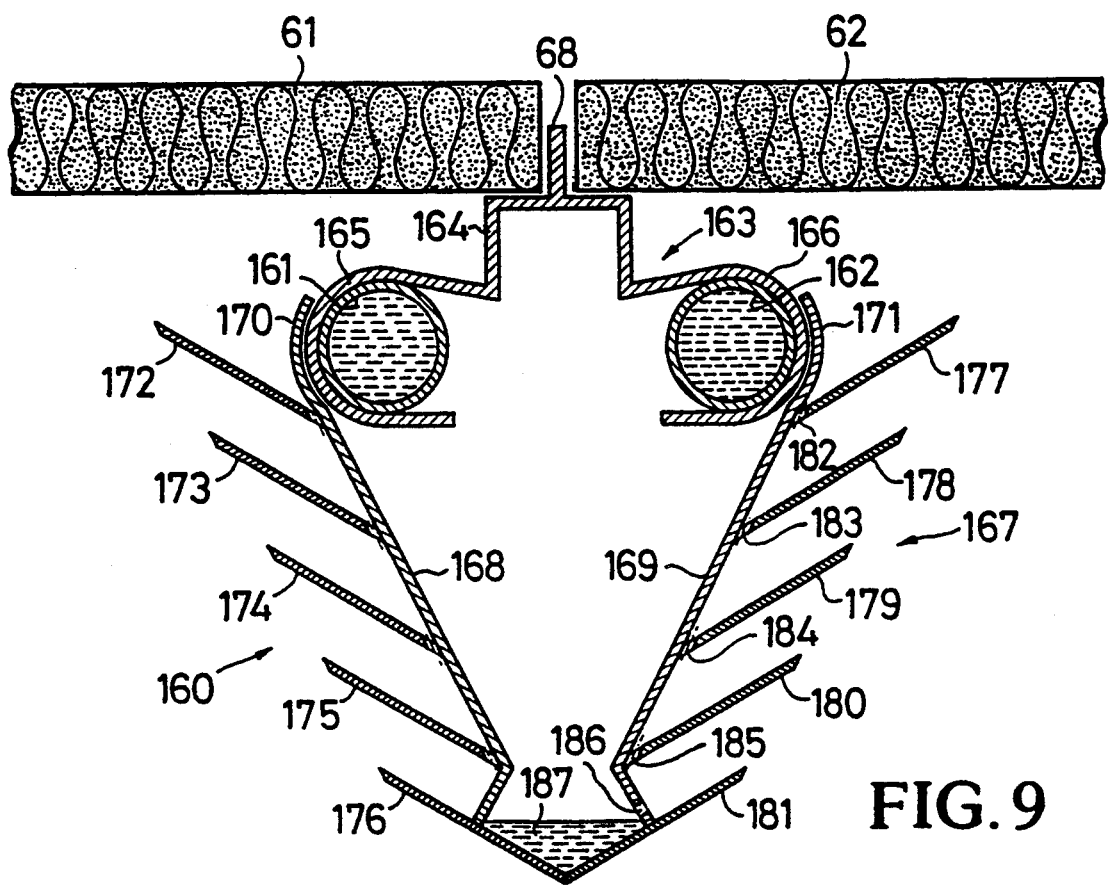
Figure 7:
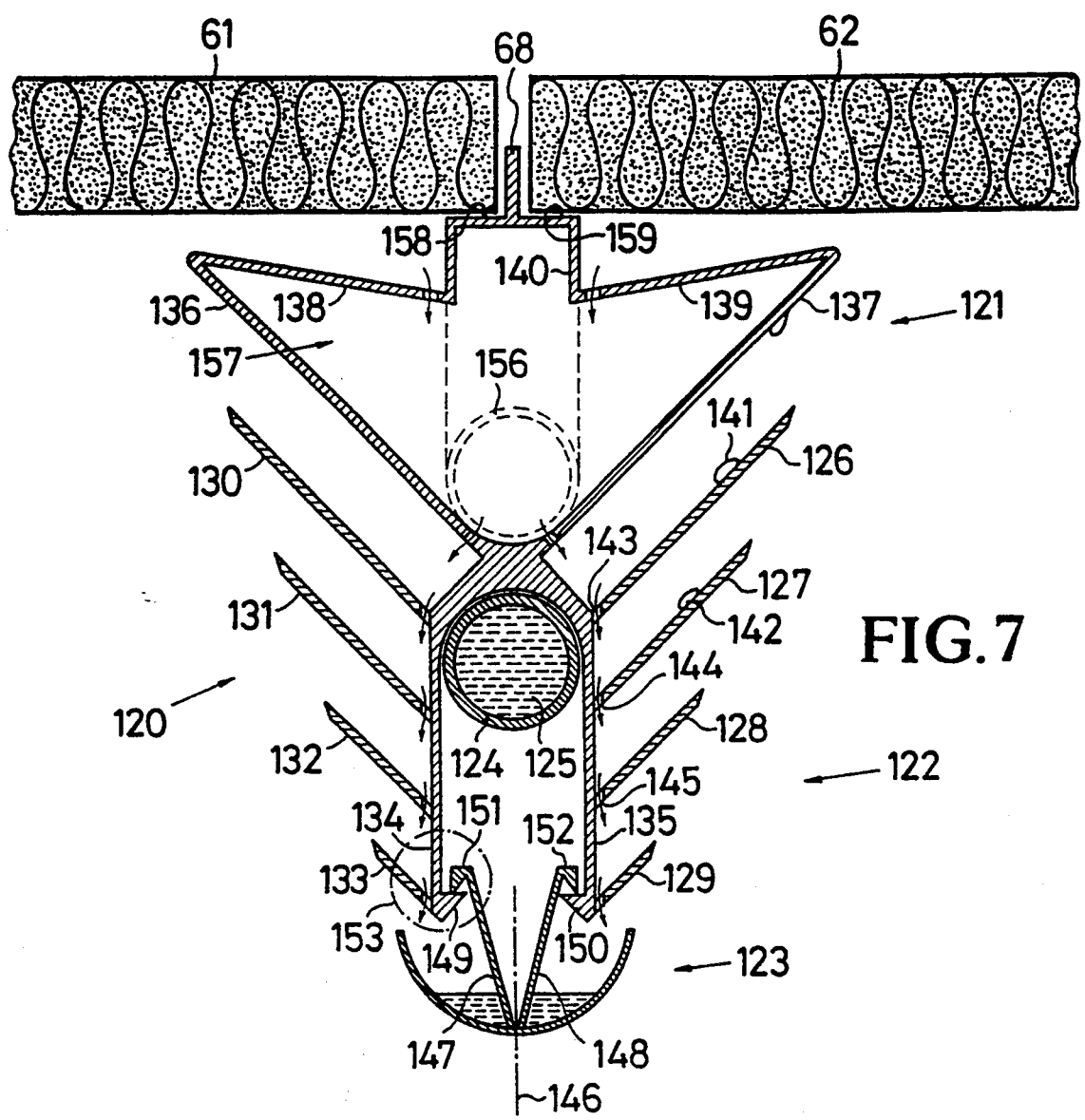
Figure 8:
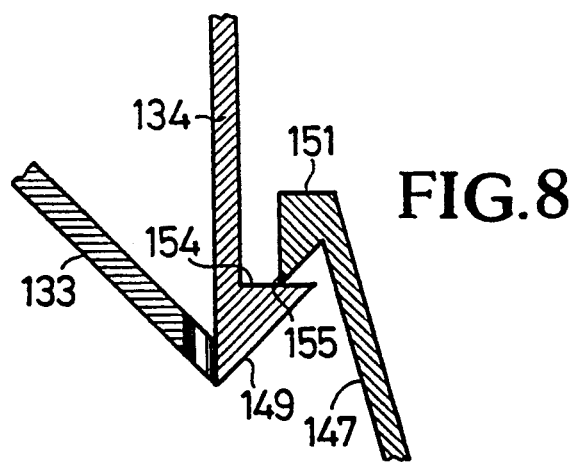
Figure 10:
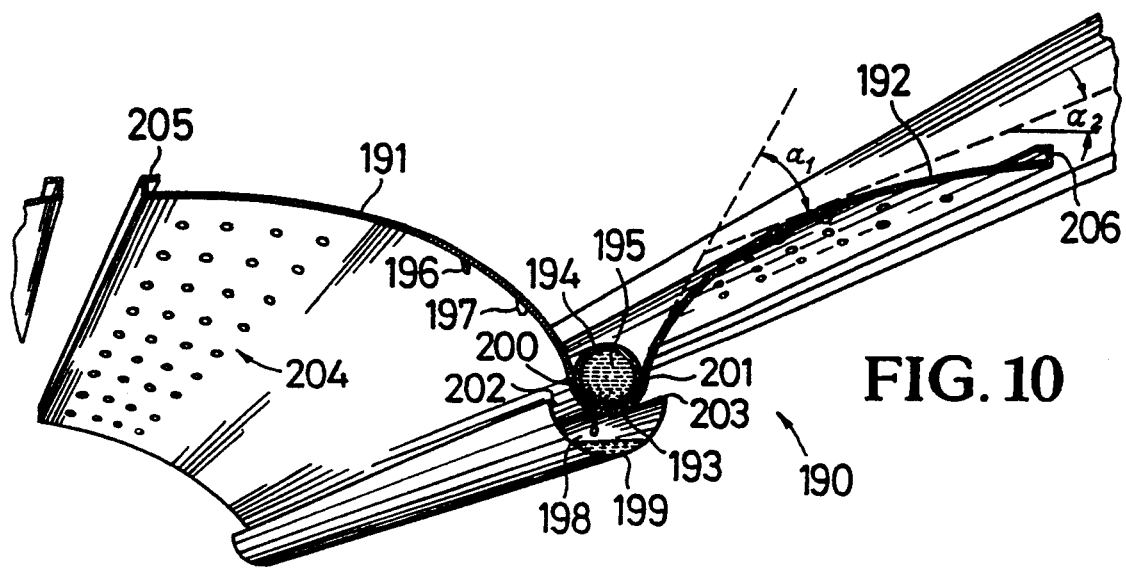
Figure 11:
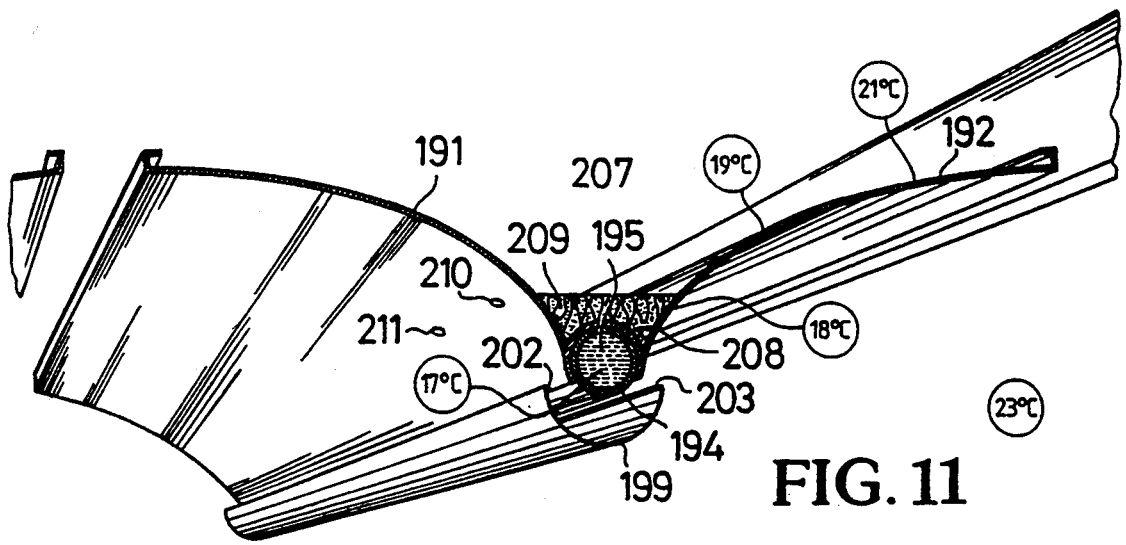
Figure 12:
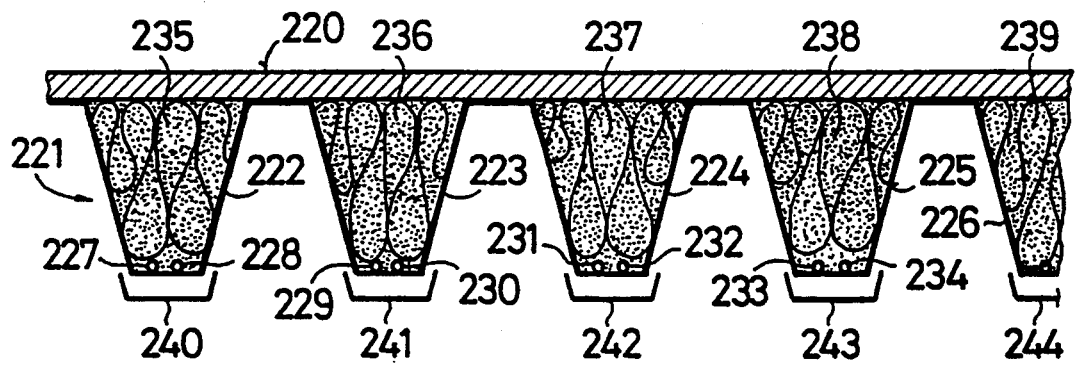
Figure 13:
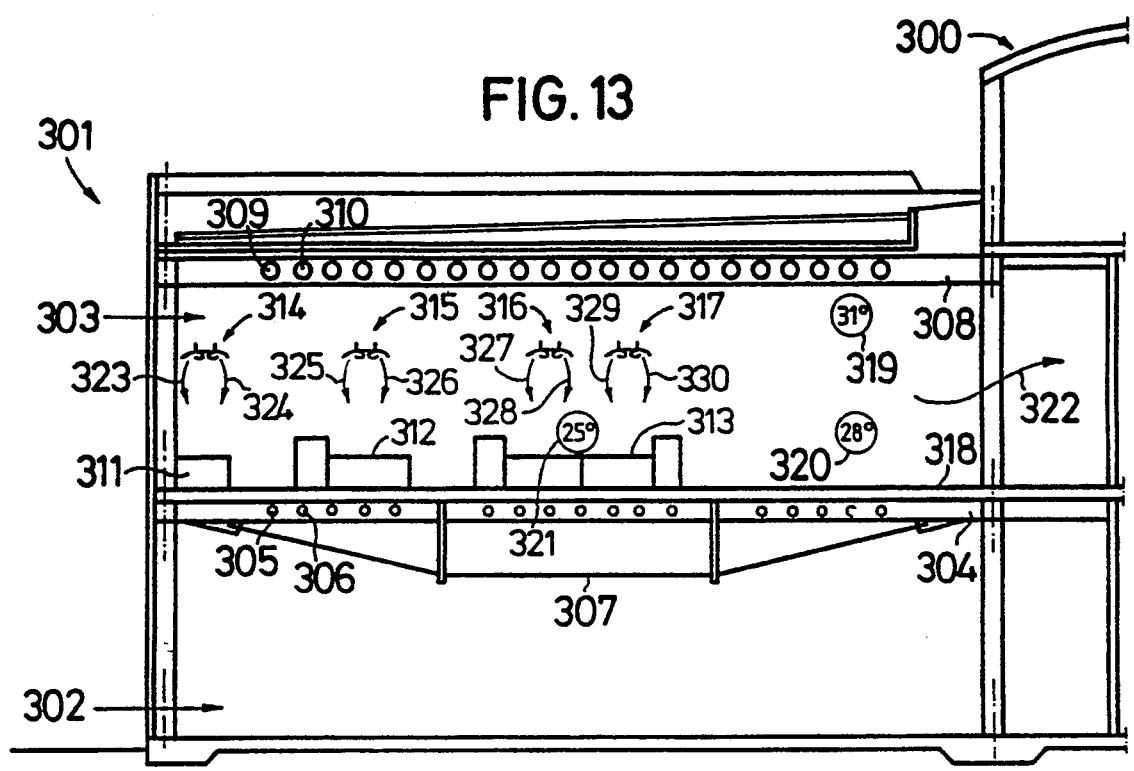
Figure 14:
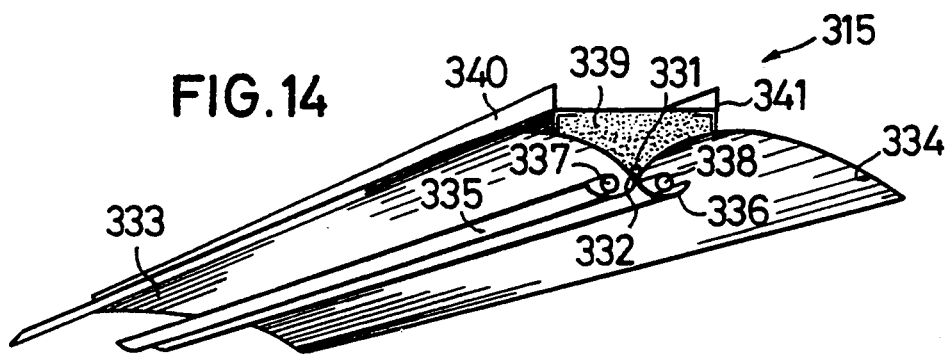
Figure 15:
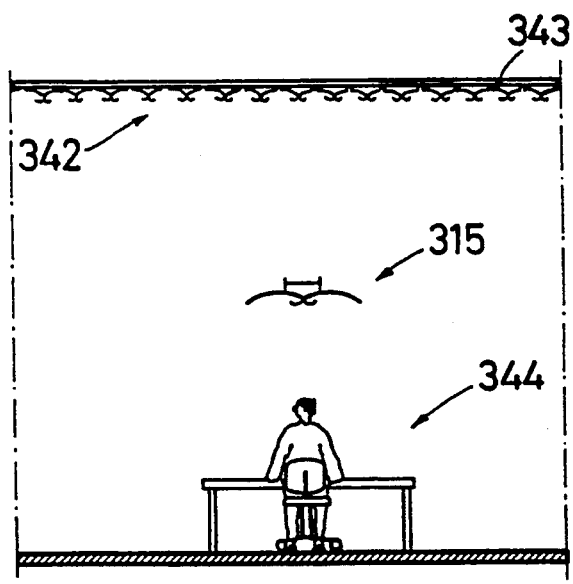
Figure 16:
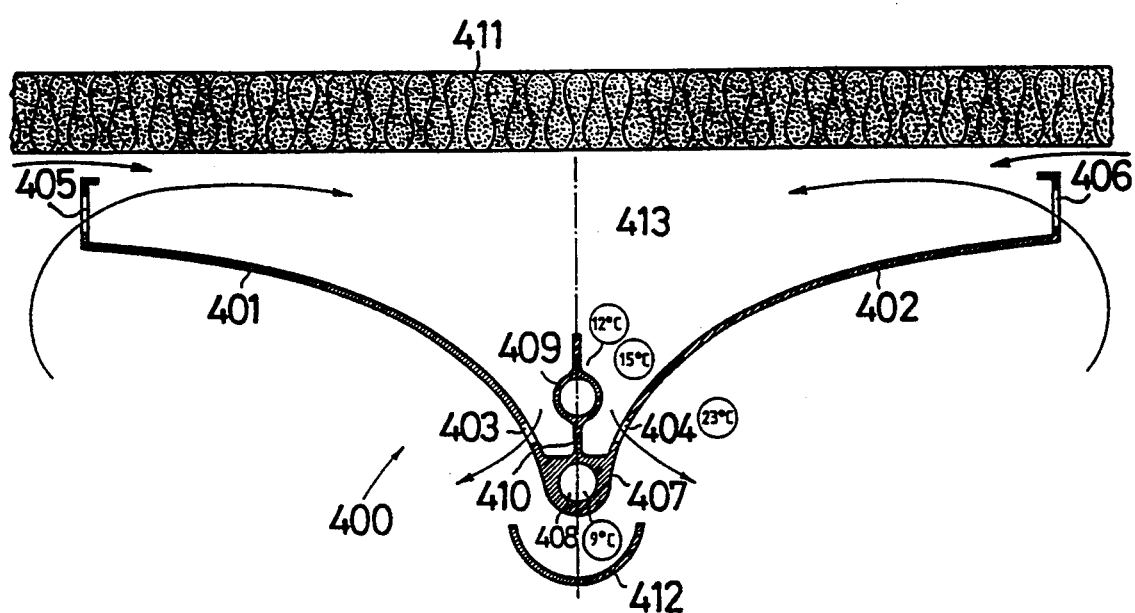

Embodiment examples of the invention are represented in the drawings and will be described in greater detail in the following. Therein show:

FIG. 1 a perspective section through a heating or cooling arrangement suspended from the ceiling with a sweat water channel;

FIG. 2 a cross section through a heating or cooling arrangement suspended from a ceiling with two sweat water channels spatially separated from each another;

FIG. 3 a perspective section through a disconnected acoustic ceiling wherein below a carrier rail implemented as cooling element a sweat water channel is provided;

FIG. 4 a cross section through an acoustic ceiling with a carrier rail functioning as cooling or heating element which via a heat insulation carries a sweat water channel;

FIG. 5 a section 5—5 through the arrangement according to FIG. 4;

FIG. 6 a carrier rail acting as cooling element with integrated indirect lighting;

FIG. 7 a carrier rail for a cooling or heating element connected with an acoustic ceiling wherein several fins are disposed on the carrier rail;

FIG. 8 a connection between a carrier rail and a channel for an arrangement according to FIG. 7;

FIG. 9 a variant of a carrier rail with fins wherein two cooling or heating pipes are disposed next to one another;

FIG. 10 a heating or cooling arrangement with parabolic surfaces and a sweat water channel;

FIG. 11 a variant of the heating or cooling arrangement according to FIG. 10 in which the heating or cooling pipes are clamped in only after the mounting of the heat radiation or absorption elements;

FIG. 12 a trapezoidal metal sheet ceiling with sweat water channel;

FIG. 13 a housing with a room having a conventional ceiling heating or cooling system and a work place heating or cooling system according to the invention;

FIG. 14 a combined arrangement for heating/cooling and for illuminating a room;

FIG. 15 a work place heating or cooling system according to the invention with a ceiling heating or cooling system according to the invention;

FIG. 16 a modification of the invention in which convectional heat is exchanged between cooling or heating elements and a mounting rail.

In FIG. 1 is shown a first embodiment of an arrangement for the prevention of sweat water development on a sweat water channel. By 1 is denoted herein a heating or cooling element which is hooked next to further identical elements 2, 3 into a carrier 4 located on a room ceiling or the like. The heating or cooling element 1 has two shanks 5, 6 disposed at an angle with respect to each other so that they essentially form a strongly widened V. At one of their outer ends they are provided with a bending-off 7, 8 with which they are hooked into a recess 9, 10 of the carrier. Each of the two shanks 5, 6 extending obliquely relative to the carrier 4 terminate in a point 11, 12 and change subsequently over to form an essentially vertical shank 13, 14 which at its upper end likewise has a bending-off 15, 16 which is hooked into a further recess 17, 18 of the carrier 4. Between the two vertical shanks 13, 14 exists a space corresponding approximately to one half of the distance between two bending-offs 7, 15 or 8, 16 respectively.

A vertical shank 13, 14 and an oblique shank 5, 6 define together in each instance a triangular hollow space in which in each instance is located a soft water tube 19, 20 which conforms itself to the triangular cross section.

The vertical shanks 13, 14 are provided approximately in the middle in each instance with outwardly directed protrusions 21, 22 in which is located in each instance a rubber profile 23, 24. Into a slit of each of these rubber profiles 23, 24 is hooked a shank 25, 26 with an upper bend 27, 28. The two shanks 25, 26 extend in the form of a V downwardly toward other so that they nearly abut onto each other and then change over to form a shank 29, 30 which extends parallel to the shanks 5, 6. The shank 29, 30 is at one end bent at 180° and changes over into a V-form substructure 31 which is common for both shanks 29, 30. The shanks 25, 26, 29, 30 as well as the substructure 31 form a sweat water channel 32 which catches the sweat water dripping from the underside of shanks 5, 6.

The sweat water channel 32 can also be implemented so that its two shanks 25, 26 are folded together i.e. lie one above the other and extend up to the carrier 4 and there terminate in a horizontal web resting on the bending-offs 15, 16. Due to the distance extended hereby between the attacking point of the cold or heat at the horizontal web and the channel proper the folded shanks act like a heat resistance because the heat is radiated off on the way between attacking point and channel.

If a room is to be cooled by a cooling fluid for example water which flows through the water tubes 19, 20 according to FIG. 1, this cooling takes place through the large-area shanks comprising a material which is a good heat-conductor, for example copper or aluminum, and which carry off the coldness of the water outwardly into the room. Since the external air is warmer than the cool shanks 5, 6 sweat or condensation water can form on the underside of these shanks 5, 6. Due to the obliquity of the shanks 5, 6 which is layed out so that the condensation water does not drip directly downward but rather first runs along the shanks 5, 6, to the drip edge 11, 12 the condensation water lastly arrives in the substructure 31 of the sweat water channel 32. If on the inner side of the shanks 5, 6 the formation of sweat water is also anticipated, this can also be drained off into the sweat water channel 32 through holes on the drip edge 11, 12. If the metallic sweat water channel 32 were directly connected with the metallic shanks 13, 14 it would also be at the lower temperature of the cooling water and would itself form condensation water on its underside which then would drip into the room without a drip collector. In order to avoid this, rubber profiles 23, 24 are provided in the recesses 21, 22 which represented a temperature barrier between the sweat water channel 32 and the shanks 13, 14 since they are elements which conduct heat poorly.

It is essential for the arrangement according to FIG. 1 that between the suspension site of the channel 32 and the underside 31 of channel 32 is provided a defined thermal resistance. The thermal resistance which in the case of monolayered structural parts is the quotient of thickness of thermal conductivity in the case of multilayered structural parts the sum of the thermal resistances of the individual structural parts can be influenced in general by varying he thickness or by varying the thermal conductivity.

Independently of the material of which the sweat water channel 32 is comprised the shanks 25, 26 should be elastically swivellable with respect to each other so that they exert a spring effect. Due to this spring effect the bending-offs 27, 28 are pushed into the rubber profiles 23, 24 or into the recesses of the shanks 13, 14.

In FIG. 2 is represented a further variant of the invention corresponding largely to the embodiment according to FIG. 1. For that reason identical parts are provided with identical reference numbers. Differing from the arrangement according to FIG. 1, the embodiment shown in FIG. 2 has cooling tubes 40, 41 with circular cross section. Moreover, rubber profiles 42, 43 are emplaced in the protrusions 21, 22, which continue downward along the surfaces of the shanks 13, 14. Into these rubber profiles 42, 43 in each instance a shank 44, 45 of a sweat water channel 46, 47 is hooked with a hook-form bend 50, 51. This shank 44 or 45 respectively extends parallel to the shank 13 or 14 respectively and changes over to become shank 48 or 49 respectively which extends parallel to the shank 5 or 6 respectively.

The condensation water forming on the underside of shanks 5, 6, flows downward on these shanks to the drip edges 11, 12 from where it falls into the sweat water channel 46, 47.

In FIG. 3 is represented a perspective section through an acoustic ceiling 60 of which two parts 61, 62 can be seen which are layed onto an inner hollow carrier rail 63. In the carrier rail 63 is located a tube 64 with a heat transport fluid 65 wherein the tube 64 is lying on a pipe 66 through which is pumped a heat carrier medium. The temperature of the heat carrier medium is consequently transported via the tube 64 and the heat transport fluid 65 to the inner walls of the carrier rail 63. The carrier rail 63 consequently functions as cooling or heating element for the subjacent room. Perpendicularly to the carrier rail 63 extends a further rail 67 which serves for the stabilization of the carrier rail 63 and is coupled with it. Due to this coupling the rail 67 can likewise assume the function of a cooling or heating element. For the further stabilization of the carrier rail 63 it has a protrusion 68 which is pushed into a gap formed by the two parts 61, 62 of the acoustic ceiling 60.

The carrier rail 63 is composed of two symmetrical half-shells 69, 70 which are produced for example in a roll-forming process of metal sheet, and below the carrier rail 63 is located a sweat water channel 71 which is connected via a web 72 with the carrier rail 63. This sweat water channel 71 comprises two halves 73, 74 of which the one half 73 is connected with the one half-shell 69 and the other half 74 with the other half-shell 70. Below the sweat water channel halves 73, 74 is provided an insulating layer 75. This insulating layer 75 prevents a sweat water formation on the underside of the carrier. It is indeed possible that the lower temperature of the cooling fluid also propagates in the pipe 66 via web 72 to the sweat water channel 71 yet this is harmless because only on the upper side of this channel can condensation water form.

FIG. 4 shows a variant of a carrier rail 80 for an acoustic ceiling 61, 63 wherein the sweat water channel 81 and the carrier rail 80 are produced as pressed aluminum profile. The carrier rail 80 in cross section has the shape of a square hollow pipe whose interior space is divided by two heat-conducting webs 82, 83 and a pipe 84 into two halves. The webs 82, 83 are connected, on the one had, with pipe 84 and, on the other, in each instance with one of the side walls 85, 86 of the carrier rail 81. Between the sweat water channel 81 and the carrier rail 80 a thermally insulating web 87 is disposed which prevents the transmission of heat or cold from the underside 88 of the carrier rail onto the sweat water channel 81. Hereby the sweat water channel 81 is thermally decoupled from the heat or cooling fluid in the pipe 84 so that no sweat water can form on the underside of the channel 81.

In FIG. 5 is represented a view A—A of the arrangement according to FIG. 4. In this view the rearward end of the carrier rail 80 as well as the channel 81 can be seen wherein this channel 81 is terminated by a perpendicular wall 90. At the bottom of channel 81 is provided a run-off port 91 through which the sweat water can be carried off. The channel 81 has, like all previously described sweat water channels, preferably an incline in the direction toward a run-off port so that no standing puddles can form in the channel 81.

In FIG. 6 is represented a carrier rail 95 which in a first approximation has a triangular cross section wherein one side 96 is planar while the two other sides 97, 98 are arched. The arched sides 97, 98 are externally reflective so that the carrier rail functions as indirect lighting. The light reflected by them is generated by a fluorescent tube 99 disposed at the intersection 100 of the two arched sides 97, 98. Below the fluorescent tube 99 is located a sweat water channel 101 which can be implemented as an involute or evolute with respect to the tube 99. The path of the ray of light of the fluorescent tube 99 is indicated, on the one hand, by the rays 102, 103, 104, 105 and, on the other hand, rays 106, 107. It is self-understood that the sides 97, 98 can also reflect daylight as is evident on the basis of the ray path 108, 109. Within the triangular carrier rail 95 is disposed a water-filled foil tube 110 on which lies a water-carrying pipe 111 through which a heat carrier medium is pumped and which due to contact with the water-filled foil tube 110 gives off to it heat or cold, which, in turn, is conducted further by the foil tube 110 to the inner walls of sides 97, 98. The advantage of the ability to combine the cooling element with the luminaire is found in the direct humidity discharge by means of the heat radiation emitted by the luminaire. The sweat water which reaches the tube 99 is, on the one hand, evaporated immediately on the tube, and, on the other hand, if it nevertheless reaches the channel, evaporated by the heat radiation of the tube 99. The mechanical connection between fluorescent tube 99 and sweat water channel 101 or carrier rail 95, respectively, is shown only schematically in FIG. 6. It is understood that these structural elements can be fastened either on the front face or can be connected with each other via not-shown carrier elements.

In FIG. 7 is represented a carrier rail 120 either fastened on an acoustic ceiling 61, 62 or supporting such a ceiling. This carrier rail 120 has an essentially triangular profile section 121 which is adjoined in the downward direction by a longitudinal profile section 122. On the underside of this longitudinal profile section 122 is disposed a sweat water channel 123 which has a semicircular cross section. In the longitudinal profile section 122 and in the immediate vicinity of the triangular profile section 121 is disposed a cooling or heating pipe 124 in which is a fluid 125. This pipe 124 is in thermally conducting contact with the carrier rail 120 and gives off heat to this carrier rail 120 or accepts heat from it.

The longitudinal profile 122 has on each side four fins 126 to 129 or 130 to 133 respectively which become smaller in the downward direction. The fins form an angle corresponding to approximately 45 degrees with respect to the side walls 134, 135 of the longitudinal profile section 122. Parallel to these fins 126 to 129 or 130 to 133 respectively extend two side walls 136, 137 of the triangular profile section 122 whose third side comprises an essentially horizontal area with two side arms 138, 139 and a protrusion 140 with a tenon 68. The sweat water 141, 142 occurring on the fins 126 to 133 runs down on these fins and when it has reached the area of the longitudinal profile section 122 penetrates through holes 143 to 145 in the fins 126 to 133 onto the next fin disposed below in each instance until it lastly falls into the sweat water channel 123. The holes 143 to 145 are for example carried from above in the downward direction parallel to the axis of symmetry 146 of the carrier rail 120 so that all hollow spaces between the fins 126 to 133 are drained.

The drainage system with the holes 143 to 145 is only required if it is possible for greater quantities of sweat water to accumulate. If the possibility of sweat water formation is low the fins 126 to 133 represent solely a safety system on which potentially forming sweat water remains standing and evaporates again.

If relatively larger amounts of sweat are to be expected the sweat water channel 123 is disposed at the lowest point of the longitudinal profile section 122, which channel is connected to a not shown drainage. The sweat water channel 123 is clipped in by means of elastic webs 147, 148 which at the deepest place of the channel 123 are connected with it. For the purpose of clipping-in, the inner side of the lower edge of the longitudinal profile section 122 as well as also the outer ends of the webs 147, 148 have projections 149, 150 or 151, 152 respectively.

How these projection engage each other for example at site 153 is represented in greater detail in FIG. 8. It can herein be seen that the projection 149 of the longitudinal profile section 122 has a level surface 154 on which rests a point 155 of the projection 151 of web 147. The sweat water channel 123 is clipped into the longitudinal profile 122 by pressing together and subsequently releasing the webs 147, 148. So that the heat transmission between the longitudinal profile section 122 and the sweat water channel 123 is as low as possible the connection between profile 122 and channel 123 comprises only the contact point of point 155 on the surface 154. The sweat water channel 123 could however also be thermally insulated in a different manner from profile section 122 or could be fabricated of synthetic material.

The advantage of a sweat water channel clipped in from below lies not only in the ability of avoiding the formation of sweat water at the lowest point of the arrangement but also therein that the profile section 122 can be opened at the bottom in order to introduce a heating or cooling pipe 124 after the carrier rail 120 has been brought into place and also be able to maintain it in the future without needing to open the ceiling 61, 62. Further forward flow or return flow pipes can be disposed in the triangular profile section 121 which is indicated by the reference number 156. The space 157 above the forward flow or return flow pipes 156 can be utilized as ventilation channel and/or for running electric cables. When used as air channel it is also useful to perforate the walls 136, 137 in order to allow the air to flow into the inner space or to draw it from it. The carrier rail 121, 140 functions as support for the individual plates 61, 62 of the acoustic ceiling wherein only small support surfaces 158, 159 are provided. The profile parts 138, 139 which are inclined toward the inside are hereby also available as cooling surfaces. Simultaneously the acoustically effective ceiling cross section is enlarged.

Since the cooling or heating pipe 124 is located approximately in the middle of the carrier rail 120 and the fins 126 to 133 extend in the direction toward this pipe 124 a uniform temperature profile results over the entire cross section of the profile of the carrier rail 120. Especially advantageous is the use of synthetic pipes as cooling or heating pipe 124, which can be squeezed readily and with one broad side are in contact with walls 134, 135. Through the fins 126 to 133 in spite of the small profile a surface results for radiating or taking up heat which overall is large. If the carrier rail 120 is used as heating system, the channels between the individual fins can be filled with water and function for the purpose of humidifying the room.

In FIG. 9 is represented a further embodiment of the invention in which the pipes in which the cooling or heating medium flows are disposed in the upper region of a carrier rail 160. Herein is provided for two pipes 161, 162 disposed next to each other a carrier profile section 163 which in cross section has a U-portion 164 directed downward which is adjoined by two lateral arms 165, 166. These arms 165, 166 encompass the two round pipes 161, 162 and conform themselves to their shape.

To these arms 165, 166 a cooling profile section 167 is clipped from below which has two shanks 168, 169 disposed in the form of a V with respect to each other which at their upper end have an arch 170, 171 which encompass the arms 165, 166 at their curved site. On the outer side of shanks 168, 169 are disposed fins 172 to 181 on which sweat water can run off toward the inside. Through bores 182 to 186 the sweat water arrives in a lower region 187 of the sweat water channel.

Ventilators are installed in the carrier, whereby the carrier has slots throughout its length and the ventilators are installed in the middle of the carrier and slots on one side are used to suck in air and slots on the other side are used to pull out air.

The advantage of the embodiment example according to FIG. 9 lies in the simple mountability of pipes 165, 166 and in the large inner cross section of the total profile section which can be used very readily for ventilation. A thermally decoupled sweat water channel is not absolutely required with this system because the cooling profile section 167 is only strongly cooled in the upper region of the cooling pipes 165, 166. At the lowest point, i.e. at the level of fins 176, 181 no sweat water is to be expected because of the resistance built up by the height of the walls 168, 169 which prevents a flow-off of the cold as far as the channel.

Elements according to the invention from FIGS. 3, 4, 5, 7, 9 are particularly suitable for stepped systems of roof windows and can be placed on carrier rails from below.

In FIG. 10 is represented a particularly advantageous heating or cooling arrangement 190 having two parabolic surfaces 191, 192 disposed mirror-symmetrically with respect to each other and connected with each other. The connection site 193 between two surfaces 191, 192 is implemented semicircularly and carries a heating or cooling pipe 194 in which flows a heating or cooling fluid 195, for example water.

While in the case of interior room cooling of the parabolic surfaces 191, 192 sweat water 196 to 198 occurs which due to the increasing obliquity of the surfaces 191, 192— represented by the tangent slopes $\alpha_1$ and $\alpha_2$—runs off in the region of the pipe 194 accelerately and drips into a sweat water channel 199, this sweat water channel, when using the pipe 194 as carrier of a heating fluid, can be filled with water which due to the heat evaporates and humidifies the interior room. At the transition places between the connection part 193 and the surfaces 191, 192 necks 200, 201 are provided which clamp in the pipe 194. Hereby ensurance is given that the pipe 194 is in very close contact with the surface 191, 192 and good heat transmission exists between the surfaces 191, 192 and the pipe 194.

The sweat water channel 199 is connected either through one or several not shown webs of a poorly heat-conducting material with the lower apex of the connection part 193 or a connection is established between the channel 199 and the surfaces 191, 192 via clamps or clasps which engage the necks 200, 201 and the bending-offs 202, 203 of the sweat water channel 199.

The surfaces 191, 192 have—preferably in the margin areas where lesser sweat water formation is to expected—perforations 204 which are provided for reasons of acoustics. The ends 205, 206 of the surfaces 191, 192 are fastened on not shown ceiling elements.

The surfaces 191, 192 are preferably realized through roll-formed steel or aluminum metal sheets. The elements are used for example in a panelled ceiling of known construction.

While in a heating or cooling arrangement according to FIG. 10 first the pipe 194 is placed into the connection part 193, and only subsequently the entire arrangement is hooked into the ceiling elements, in the embodiment according to FIG. 11 the cooling pipe 194 is clamped in only after the arrangement has already been connected with the ceiling.

This variant can readily be maintained from below without needing to open the ceiling. This is of advantage especially for reasons of warranty. In addition, the room air comes directly into contact with the cooling pipe 194. In order to avoid a cooling of the hollow space 207 of the ceiling an insulation 209 is provided above a connection piece 208 which with respect to the connection piece of FIG. 10 is rotated by 180 degrees. This insulation 209 functions simultaneously for the improvement of the stability of the surfaces 191, 192 which are preferably realized through aluminum profile sections.

The cooling pipe 194 comprises a metallic material or a synthetic material. Synthetic material has the advantage that it can be clamped more readily into the connection piece 208.

In the surface 191, 192 are provided holes 210, 211 which permit the sweat water to run off which forms on the top side of surfaces 191, 192 in the hollow space of the ceiling.

The sweat water channel 199 is either closed off on the front face in order to avoid the running-out of the sweat water or it is connected to a drainage.

The temperature of the surfaces 192 is given as 18° C., 19° C. or 21° C. respectively depending on the distance from the cooling pipe 194 whose cooling fluid has for example a temperature of 17° C. The room temperature to be lowered in this example is 23° C. Under central European climatic conditions the formation of sweat water is to be expected only up to a temperature of 19° C.

Elements after FIGS. 1, 2, 10, 11 according to the invention are disposed as panel ceilings in commercially available panel ceiling carrier rails or also in combination with panel ceilings in which individual panels are replaced by cooling or heating elements according to the invention.

In FIG. 12 is represented a trapezoidal metal sheet ceiling with a sweat water channel according to the invention. Such a trapezoidal metal sheet ceiling is available on the market as industrially prefabricated ceiling. It functions as a rule for reinforcing a present base ceiling. Below such a base ceiling 220 is disposed a metal sheet 221 which in cross section comprises several trapezoids 221 to 226 connected with one another. In each of these trapezoids 221 to 226 are disposed in each instance two cooling pipes 227 to 234 through which flows a cooling fluid. Above the cooling pipes 227 to 234 an acoustic insulating material 235 to 239 is emplaced which reaches to the basic ceiling. In the immediate vicinity of and below the trapezoids 221 to 226 is disposed in each instance a sweat water channel 240 to 244 which serves as a collector for the sweat water running down on the side walls of a trapezoid. The mechanical connection between the sweat water channels 240 to 244 and the trapezoids is not shown in detail. However, connections can be chosen such as are known from the previously described embodiments for example from FIGS. 3 and 4.

FIG. 13 shows an application example for a climate ceiling according to the invention which functions for the special air-conditioning of work places. next to a main building 300 of a company which is not shown completely is located an additional building 301 wherein this additional building has a ground floor 302 and a top floor 303. The ceiling 304 of the ground floor is provided with heating or cooling pipes 305, 306 . . . and a supporting structure 307. In the ceiling 308 of the top floor 303 is also disposed a cooling ceiling according to the invention with a cooling capacity of 100 watts/m$^2$.

These cooling ceilings are supplemented by additional work place cooling or heating arrangements according to the invention which are located between the ceiling 308 and the work places 311, 312, 313. In FIG. 13 such arrangements 314 to 317 are represented wherein their means of fastening are left open. They can be fastened on the ceiling 308 as already described previously. But it is also possible to dispose them on not shown supports which stand on the floor 318 and function as climatic umbrellas.

In FIG. 14 is shown in greater detail one of the arrangements 314 to 317 from FIG. 13. Herein can be seen a cooling or heating pipe 331 immersed in a trough 332 located between two light reflectors 333, 334. Underneath these reflectors are two smaller optical reflectors 335, 336 above which are disposed fluorescent tubes 337, 338. The panel from FIG. 10 is closed in the upward direction by a cooling channel 340, 341 and forms an air channel 339 functioning for supplying fresh air to the work place.

FIG. 15 shows the cooling ceiling according to the invention from FIGS. 10, 11 below the ceiling in which the general cooling or heating of the room is generated via several arrangements disposed next to one another wherein these arrangements 342 are disposed directly below a ceiling 343.

Below this arrangement 342 is located a special work place cooling or heating system 315 which in principle is constructed the same way as the individual heating or cooling elements of the arrangement 342. In this way it is possible to cool or heat a work place 344 differently from the remaining surroundings.

The heating or cooling medium can also be a cooling means wherein the ceiling heating or cooling elements are used as evaporator or condenser, respectively.

The invention effectively prevents going below the dew point on the underside of a sweat water channel.

By dew point is understood that state of a gas vapor mixture in which in the saturated state a condensate forms. FIG. 16 shows an embodiment of the invention in which a cooling device 400 comprises parabolic sheets 401, 402 which substantially correspond to the sheets disclosed in the embodiment of FIG. 10. Different from the embodiment shown in FIG. 10 the modification of FIG. 16 provides a convectional flow of heat through slots 403, 404 and 405, 406, respectively. The slots 403, 404 in the lower portion of the sheets 401, 402 are, for instance, four times higher than wide and arranged at distances which correspond to their width. On the contrary, the slots 405, 406 are approximately three times wider than high and arranged at distances which correspond to their width. Holes may be provided throughout the whole sheets 401, 402. Both sheets 401, 402 are connected to each other in a lower portion 407 which comprises a pipe-like flow 408 of a heating or cooling medium. A back-flow 409 of the heating or cooling medium is arranged above the portion 407 and connected to this portion 407 by means of a web 410. A ceiling at which the complete device 400 may be suspended is designated with numeral 411. Instead of pipe-like flows and back-flows 408,409 four pipes being arranged one above the other, for instance, can be provided, said pipes having no direct contact at all with the sheets 401, 402 and two of them serving as flows, whereas the other two serve as back-flows. The pipes can be arranged between the sheets 401, 402 whereby these sheets are not connected with distance to each other. That way special slots are not necessary.

Below the portion 407 a condensator channel 412 having a cross-section of the semi-circle is arranged. Its fixing is not shown so as to simplify the drawing. Anyhow, between one of the two surfaces of the condensation channel 412 and the portion 407 a thermal resistance having a predetermined heat insulation factor is provided, so that at the lower surface of the condensation channel 412 the dew point will not be reached.

As is shown in FIG. 16 the pipes 408, 409 being passed by a fluid may be arranged without any direct contact or with a reduced contact to the carriers 401, 402. Then the heat exchange will primarily be realized by convection and/or radiant heat. A lake of cold or warm air will establish in the space 413 which will cool or heat the sheets 401, 402.

Incidentally, the profiles of the carriers shown in FIGS. 4, 6, 7 may be passed by a fluid themselves so that these profiles serve as a pipe system. The condensation channel does not only receive the condensation water developping at a carrier, but also the condensation water originating at the very pipe being passed by a fluid.

I claim:

1. A cooling arrangement, in particular in the form of a structure suspended from a ceiling comprising:
   a pipe or tube system (46,76) in which a fluid flows which serves for the transport of heat;
   a large surface heat conducting means (12), said large surface heat conducting means being in good thermal contact with said pipe or tube system;
   a sweat water drip collector (14, 22, 70) arranged below the lowest position of said large surface heat conducting means (12);
   a carrier (15) for the cooling arrangement which is immovably coupled with the cooling arrangement with respect to at least a vertical coordinate and one of two horizontal coordinates;
   said cooling arrangement further characterized in that:
   a thermal resistance is provided between said pipe or tube system and said sweat water drip collector, said thermal resistance being directly or indirectly connected between at least one surface of said sweat water drip collector and said large surface heat conductor means, said thermal resistance having a heat insulation value so that at least on the underside of the sweat water drip collector, a falling below the dew point is prevented;
   said large surface heat conducting means is at least partly provided between said pipe or tube system and said sweat water drip collector; and
   the sweat water drip collector is mounted at a portion of said large surface heat conducting means.

2. A cooling arrangement as stated in claim 1, characterized in that the heat resistance (23; 42, 43; 75; 87; 100, 90; 126 to 133, 155; 171 to 181) is increased through the low thermal conductivity of the materials used.

3. A cooling arrangement as stated in claim 1, characterized in that the heat resistance (23; 42. 43; 75; 87; 100, 90; 126 to 133, 155; 171 to 181) is increased through a large heat-conducting cross section of the heat-conducting material.

4. A cooling arrangement as stated in claims 1 or 2, characterized in that the heat resistance is a poor thermal conductor (23; 42, 43, 87) disposed between the sweat water drip collector (32; 47) and the carrier (5, 6).

5. A cooling arrangement as stated in claims 1 or 3, characterized in that the heat resistance is a gradient connection (126 to 133; 171 to 181) of good thermal conductivity between the sweat water channel drip collector (123, 187) and the carrier (134, 135; 163) which carries off or absorbs essentially continuously the coldness or heat of the hollow rail (134, 135; 163) up to the sweat water drip collector (123, 187).

6. A cooling arrangement as stated in claim 1, characterized in that the heat resistance is a thermally poorly conducting element (75) which shields at least the underside of the sweat water drip collector (71) against humid ambient air.

7. A cooling arrangement as stated in claim 1, characterized in that the carrier (5, 6) serves additionally as fresh air or air-outlet conduit.

8. A cooling arrangement as stated in claim 1, characterized in that the carrier comprises two channels (5, 13; 6, 14) with essentially triangular cross section in which in each instance a pipe or tube system (19, 20) is disposed, that these channels (5, 13; 6, 14) are diposed at a distance from each other and in the intermediate space of the sweat water drip collector (32) below one point of the triangle of the channels (5, 13; 6, 14).

9. A cooling arrangement as stated in claim 8, characterized in that the channels (5, 13; 6, 14) are hooked into recesses (9, 10) of a panel ceiling carrier rail (4).

10. A cooling arrangement as stated in claim 9, characterized in that the sweat water drip collector is hooked in a gap between two channels (5, 13; 6, 14) into the panel ceiling carrier rail (4).

11. A cooling arrangement as stated in claim 6, characterized in that the sweat water drip collector (71) is a rail which is connected via a web (72) with the carrier (63) and on its underside carries a thermally insulating layer (75).

12. A cooling arrangement as stated in claim 1, characterized in that the carrier (69, 70) and the sweat water drip collector (74, 75) are a roll-formed metal sheet arrangement joined together of two symmetrical halves.

13. A cooling arrangement as stated in claim 1, characterized in that in the carrier a heating or cooling pipe (66) is disposed which is surrounded by a hose (64) filled with a heat-conducting fluid which tube is in contact with the inner walls of the carrier.

14. A cooling arrangement as stated in claim 1, characterized in that the carrier (63) serves as support onto which can be placed glass panes or acoustic panels (61, 62).

15. A cooling arrangement as stated in claim 1, characterized in that the carrier (80) is produced in the form of an aluminum profile section and cooling tubes (8, 4) are a component part of the aluminum profile section (88) and are together with it drawn in one pressing process.

16. A cooling arrangement as stated in claim 15, characterized in that the sweat water drip collector (81) is connected via a thermal insulation (87) with the underside of the carrier (80).

17. A cooling arrangement as stated in claim 1, characterized in that the sweat water drip collector (81) is provided with a condensation water outlet (91).

18. A cooling arrangement as stated in claim 1, characterized in that the sweat water drip collector (81) has an incline with respect to the earth's surface so that the sweat water flows off into a particular area of the collector (81).

19. A cooling arrangement as stated in claim 1, characterized in that the carrier (95) for the tube or pipe system (111) has concavely arched reflector walls (97, 98) which reflect the light of one or two artificial light sources (90) disposed below the carrier (95).

20. A cooling arrangement as stated in claim 19, characterized in that below the artificial light source (90) are provided two further light reflectors (101, 102) which serve as sweat water drip collectors.

21. A cooling arrangement as stated in claim 5, characterized in that the carrier is a rail (122) open in the downward direction and that in the opening from below cooling pipes (124) are placed, and that the rail has on its outer side several fins (126 to 133) which are directed upward at an angle to side shanks (134, 135) of the rail (122).

22. A cooling arrangement as stated in claim 21, characterized in that above the rail (122) is located an essentially triangular channel (121) in which a cooling pipe (156) can be provided and which serves as ventilation channel.

23. A cooling arrangement as stated in claim 21, characterized in that the fins (126 to 133) become smaller in the downward direction and in the area of the shanks (134, 135) of the rail (122) open in the downward direction have perforations (143 to 145) through which sweat water can run off from one fin (126) to the next lower fin (127).

24. A cooling arrangement as stated in claim 21, characterized in that below the open side of the rail (122) a sweat water drip collector (123) is disposed which can be clipped into the lower opening of the rail (122).

25. A cooling arrangement as stated in claim 24, characterized in that the contact between the rail (122) and sweat water drip collector (123) is point-form or strip-form.

26. A cooling arrangement as stated in claim 1, characterized in that the carrier has a U-rail (164) whose shanks are adjoined by curved arms (165, 166) which encompass a pipe (161, 162) filled with a cooling fluid.

27. A cooling arrangement as stated in claim 26, characterized in that a temperature barrier has two surfaces (168, 169) forming a V which are provided on their outer side with fins (172 to 181) wherein the surfaces (168, 169) have above an uppermost fin (172, 177) and a curved area (170, 171) which encompasses a curved region of the arms (165, 166), and that the lowest fins (176, 181) of the surfaces (168, 169) are displaced toward the inside in such a way that they form the sweat water drip collector (187).

28. A cooling arrangement as stated in claim 1, characterized in that the carrier has two hyperbola shaped wings (191, 192) which are connected through a semicircular connection element (193) wherein in a trough formed through the connection element (193) cooling tubes (194) are provided.

29. A cooling arrangement as stated in claim 28, characterized in that the wings (191, 192) are provided with punched perforations (204).

30. A cooling arrangement as stated in claim 28, characterized in that the connection element (193) is open in the upward direction and the cooling pipe is placed in from above.

31. A cooling arrangement as stated in claim 28, characterized in that the connection element (208) is open in the downward direction and the cooling pipe (194) is inserted from below.

32. A cooling arrangement as stated in claim 31, characterized in that above the cooling pipe (194) an insulation is provided.

33. A cooling arrangement as stated in claim 28, characterized in that the carrier forms a ceiling panel which is hooked into a panel carrier rail.

34. A cooling arrangement as stated in claim 1, characterized in that the carrier is formed by a trapezoidal ceiling (221) in whose trapezoids (222 to 226) cooling pipes (227 to 234) are inserted wherein below each trapezoid (222 to 226) a sweat water channel (240 to 244) is provided.

35. A cooling arrangement according to claim 2, 3, 6, 7, 8, 9, 10, 11, 12, 13, 14, 15, 16, 17, 18, 19, 20, 26, 27, 28, 29, 30, 31, 32, 33 or 34, characterized in that in a space between ceiling and floor ceiling cooling elements are disposed on which are disposed additional reflector wings (353, 354) and which are provided with at least one artificial light source.

36. A cooling arrangement according to claim 2, 3, 6, 7, 8, 9, 10, 11, 12, 13, 14, 15, 16, 17, 18, 19, 20, 26, 27, 28, 29, 30, 31, 32, 33 or 34, characterized in that in a space above work places individual climatic umbrellas are disposed.

37. A cooling arrangement as stated in Claim 1,characterized in that into the carrier or the sweat water channel sprinkler heads are embedded and that the pipe tube system is connected to the sprinkler heads and extinguisher water can be pumped into the pipes.

38. A cooling arrangement according to Claim 2, 3, 6, 7, 8, 9, 10, 11, 12, 13, 14, 15, 16, 17, 18, 19, 20, 26, 27, 28, 29, 30, 31, 32, 33, 34, or 37, characterized in that in the carrier ventilators are installed and the that the carrier is used as an air duct, whereby the carrier has slots throughout its length and that the ventilators are installed in the middle of the carrier and slots on one side are used to suck in air and slots in the other side are used to pull out air.

39. A cooling arrangement as stated in claim 1, characterized in that the fluid is a cooling means and the ceilings are used as evaporator or condenser.

40. A cooling arrangement as stated in claim 1, characterized in that the selector is disposed so that only sweat water running off on the outer side of the carrier can run off into the selector.

41. A cooling arrangement as stated in claim 1, characterized in that the heat-conducting material is reduced between the cooling pipe and the underside of the sweat water drip collector.

42. A cooling arrangement as stated in claim 1, characterized in that between the pipe or tube system (407, 409) and the carrier (403, 404; 405, 406) a thermal coupling is provided which is constituted by convection and/or radiation.

43. A cooling arrangement as stated in claim 5, characterized in that the carrier has a U-rail (164) whose shanks are adjoined by curved arms (165, 166) which encompass a pipe (161, 162) filled with a cooling fluid.

* * * * *